C. E. PERKINS.
UNIVERSAL JOINT.
APPLICATION FILED DEC. 18, 1914.
1,148,532.          Patented Aug. 3, 1915.
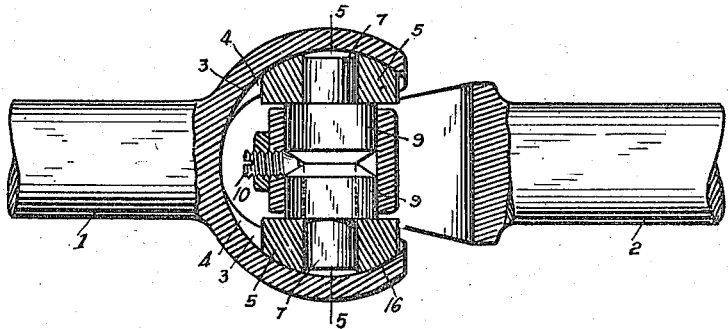
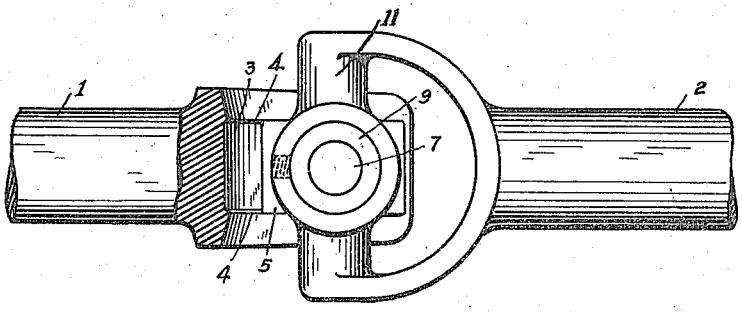
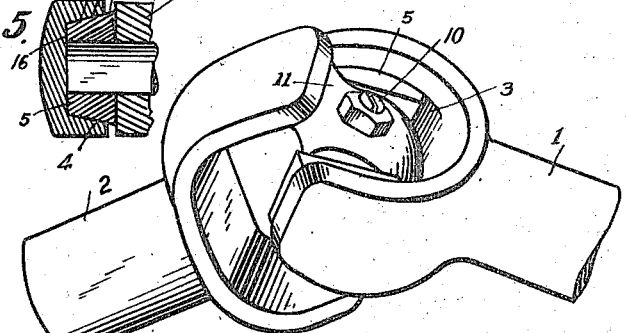
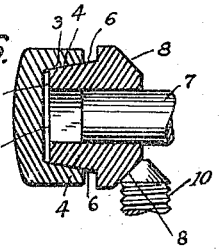
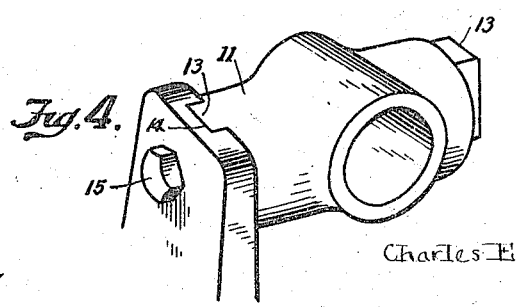
Witnesses
J. W. Bradford
Marion A. Thompson
Henrietta Vander Myde
Inventor
Charles E. Perkins
By Cyrus W. Rice
his Attorney

UNITED STATES PATENT OFFICE.

CHARLES E. PERKINS, OF GRAND RAPIDS, MICHIGAN.

UNIVERSAL JOINT.

1,148,532.　　　　　　　　Specification of Letters Patent.　　　Patented Aug. 3, 1915.

Application filed December 18, 1914. Serial No. 877,878.

*To all whom it may concern:*

Be it known that I, CHARLES E. PERKINS, a citizen of the United States, residing at Grand Rapids, in the county of Kent and State of Michigan, have invented new and useful Improvements in Universal Joints, of which the following is a specification.

My present invention relates to universal joints, such as are employed to connect rotatable shafts not alined; and its object is to provide an improved joint of that character which shall have means for taking up the wear of its bearing parts; and further, whose parts may be readily assembled. This and any other objects appearing hereinafter, are attained by, and the invention finds a preferable embodiment in, the structure hereinafter described and illustrated by the accompanying drawings, in which:—
Figure 1 is a side view of my universal joint, certain parts being sectioned; Fig. 2 is a similar view, the shaft members being turned at right-angles to their position shown in Fig. 1; Fig. 3 is a view in perspective of the joint, the shaft members being shown out of alinement; Fig. 4 is a like view of a modified construction of certain parts; Fig. 5 is an axially sectional view of certain parts taken on a plane corresponding with line 5—5 of Fig. 1; and Fig. 6 is a like view showing a modified construction.

The rotatable shaft members 1 and 2, either of which may be the driven shaft, are connected by the universal joint. One of these shafts, 1, is provided with an internal arcuate groove 3 whose axis is at right-angles to that of such shaft and whose sides 4 converge toward the bottom of the groove. The connecting member comprises oppositely-disposed segments 5 rocking in the groove longitudinally and having converging sides 6 corresponding to the sides 4 of the groove. These segments are pivotally carried by the other shaft member 2 on a spindle 7 whose axis is at right-angles to that of said shaft member 2. The inner faces 8 of the segments, as particularly shown in Fig. 6, or those of the collars 9 surrounding the spindle and abutting against the inner faces of the segments as shown in other figures, are relatively inclined as shown, so as to be forced apart by wedging means, as the conically-pointed set-screw 10 threaded in a cross bar 11 of shaft member 2, so that by turning this screw the segments may be forced outwardly or away from each other, to adjust the same relatively to the bottom of the groove. The cross bar 11 may be formed integral with the shaft member 2, or it may be a separate piece having lugs 13 adapted to be seated in recesses 14 in such shaft member, being secured therein by bolts 15.

It will be seen that as the segments become worn, the wear may be taken up and the rock bearing of the segments in the groove may be tightened, by turning the screw down to force the converging sides of the segments and the groove into proper contact, and that the wear on the outer faces 16 of the segments may be similarly taken up, which face wear would be taken up in the same manner though the sides did not so converge. The outer faces 16 may be shortened, as shown in Fig. 6, so as not to reach the bottom of the groove, to insure at all times proper contact at the sides; although, should these outer faces wear more slowly than the sides, the parts may be readily disassembled and such faces shortened so as to permit a proper contact of the sides.

The groove as shown has an arcuate extension of more than a half circle to hold the segments therein: It will be seen however, that the segments may be inserted into and removed from the groove, to assemble or disassemble the parts, (and without changing the relative direction of the shaft members), by merely turning the screw sufficiently to permit the segments to be moved toward each other far enough to pass the mouth of the groove; whereupon the screw, being oppositely turned, will cause the proper contact between the groove and the segments. It will be seen too, that the described adjusting of the segments will also take up any wear occasioned by the relative endwise movement of the shaft members.

By constructing the parts so that the arcuate groove is in the shaft as shown, the lubricant is kept in the groove by centrifugal force and is thus prevented from being thrown out by such force.

Not confining myself to details of construction shown or described, I claim:—

1. In a universal joint; shaft members; a connecting member therefor comprising oppositely-disposed segments rocking on the first shaft member on an axis at right-angles to that of the first shaft member, and carried by the second shaft member on a pivotal axis at right-angles to that of the second shaft member; and means for adjusting the segments toward and away from each other.

2. In a universal joint; shaft members; a connecting member therefor comprising oppositely-disposed segments rocking on the first shaft member on an axis at right-angles to that of the first shaft member in an arcuate bearing of more than a half circle, and carried by the second shaft member on a pivotal axis at right-angles to that of the second shaft member; and means for adjusting the segments toward and away from each other.

3. In a universal joint; a first shaft member; a connecting member rocking on the first shaft member on an axis at right-angles to that of the first shaft member and comprising oppositely-disposed segments, one of said members having an arcuate groove bearing for the rocking movement whose sides converge toward the bottom of the groove, and the other said member having converging sides corresponding to and engaging those of the groove; a second shaft member by which the connecting member is carried on a pivotal axis at right-angles to that of the second shaft member; and means for adjusting the segments toward and away from each other.

4. In a universal joint; a first shaft member; a connecting member rocking on the first shaft member on an axis at right-angles to that of the first-shaft member and comprising oppositely-disposed segments, one of said members having an arcuate groove bearing of more than a half circle whose sides converge toward the bottom of the groove, and the other said member having converging sides corresponding to and engaging those of the groove; a second shaft member by which the connecting member is carried on a pivotal axis at right-angles to that of the second shaft member; and means for adjusting the segments toward and away from each other.

5. In a universal joint; a first shaft member; a connecting member rocking on the first shaft member on an axis at right-angles to that of the first shaft member and comprising oppositely-disposed segments, one of said members having an arcuate groove bearing for the rocking movement whose sides converge toward the bottom of the groove, and the other said member having converging sides corresponding to and engaging those of the groove; a second shaft member by which the connecting member is carried on a pivotal axis at right-angles to that of the second shaft member; and a conically-pointed set-screw threaded in the second shaft member and adapted to adjust by its turning movement the segments toward and away from each other.

6. In a universal joint; a first shaft member; a connecting member rocking on the first shaft member on an axis at right-angles to that of the first shaft member and comprising oppositely-disposed segments, one of said members having an arcuate groove bearing for the rocking movement whose sides converge toward the bottom of the groove, and the other said member having converging sides corresponding to and engaging those of the groove; a second shaft member by which the connecting member is carried on a pivotal axis at right-angles to that of the second shaft member; and wedging means engaging between the inner faces of the segments and adapted to adjust the segments toward and away from each other.

In testimony whereof I have hereunto set my hand in presence of two subscribing witnesses.

CHARLES E. PERKINS.

Witnesses:
CYRUS W. RICE,
MARION A. THOMPSON.